(12) United States Patent
Sreenivas et al.

(10) Patent No.: US 11,128,616 B2
(45) Date of Patent: Sep. 21, 2021

(54) PROXIMITY BASED SECURITY

(71) Applicant: Privacy Labs, Inc., Bellevue, WA (US)

(72) Inventors: Giridhar Sreenivas, Bellevue, WA (US); Derek Sigurdson, Bothell, WA (US)

(73) Assignee: PRIVACY LABS, INC., Bellevue, WA (US)

( * ) Notice: Subject to any disclaimer, the term of this patent is extended or adjusted under 35 U.S.C. 154(b) by 457 days.

(21) Appl. No.: 16/162,268

(22) Filed: Oct. 16, 2018

(65) Prior Publication Data
US 2020/0120087 A1    Apr. 16, 2020

(51) Int. Cl.
*H04L 29/06* (2006.01)
*H04L 9/32* (2006.01)

(52) U.S. Cl.
CPC ........ *H04L 63/0838* (2013.01); *H04L 9/3213* (2013.01); *H04L 63/0227* (2013.01); *H04L 63/0492* (2013.01); *H04L 63/0876* (2013.01)

(58) Field of Classification Search
CPC ..... H04L 63/08; H04L 63/082; H04L 63/083; H04L 63/106; H04L 63/205; H04L 63/0838; H04L 9/3213; H04L 63/0227; H04L 63/0492; H04L 63/0876; H04W 12/06
See application file for complete search history.

(56) References Cited

U.S. PATENT DOCUMENTS

| | | | | |
|---|---|---|---|---|
| 2008/0104680 A1* | 5/2008 | Gibson | ................ | G06F 21/34 726/5 |
| 2010/0077208 A1* | 3/2010 | Appiah | ............... | H04L 63/0823 713/158 |
| 2016/0119306 A1* | 4/2016 | Matthews | ............... | H04L 63/08 726/6 |

* cited by examiner

*Primary Examiner* — Yogesh Paliwal
(74) *Attorney, Agent, or Firm* — Christensen O'Connor Johnson Kindness PLLC

(57) ABSTRACT

In accordance with this disclosure, a system and method for remotely enabling proximity-based authentication is provided. A computing device initiates a secure server based on proximity-based communication when the computing device is in a vicinity of the secure server. The computer device then prompts proximity-based authentication to establish a secure connection with the secure server. As a result of the proximity-based authentication, the computing device is authenticated and locally stores a secure token sent from the secure server in response to the proximity-based authentication. Once the authenticated computing device communicates with the secure server, remote authentication is initiated to the secure server and the authenticated computing device is remotely connected to the secure server if the stored secure token is properly accepted by the secure server for authentication.

6 Claims, 7 Drawing Sheets

PROXIMITY BASED SECURITY

BACKGROUND

Computer security is a paramount concern with computer users. There are many mechanisms that seek to secure access to computing systems, such as passwords. Straining the need for computer security is the equally prevalent desire for remote computer access. Computer users frequently travel with mobile computing devices and access many different Internet services or enterprise systems from remote locations.

Mobile computing devices enable users to remotely connect to a server of various services or enterprise systems through a public network. However, unlike a private network, the public network is more likely to expose the server to malicious attacks or unwanted intrusions by unauthorized individuals. The computer industry constantly struggles with the balance between ease of access for authorized users versus adequate security to fend off digital intruders.

SUMMARY

In accordance with this disclosure, a system and method for enabling proximity-based authentication is provided. A computing device initiates a proximity-based communication with a secure server when the computing device is in a physical proximate vicinity of the secure server. While in proximity to each other, the secure server delivers a security token to the computing device which stores it locally on the computing device. Once authenticated, the computing device may communicate with the secure server from remote locations, such as over the public network, by transmitting the security token to the secure server. In this way, the computing device and the secure server enjoy a heightened level of trust based on the fact that the computing device must have been proximate to the secure server in order to receive the security token. Alternatively, the secure token may be implemented as a seed to generate a one-time password. Once the seed is locally stored on the computing device, the computing device may communicate with the secure server by transmitting a one-time authentication passcode generated from the seed. The knowledge that the computing device was in proximity to the secure server tends to demonstrate that the computing device is in the possession of a trusted user.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

Note that the same numbers are used throughout the disclosure and figures to reference like components and features.

DETAILED DESCRIPTION

This disclosure is provided with specificity to meet certain statutory requirements. However, this description is not intended to limit the scope of the claims. The claimed subject matter may be embodied in many ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully with reference to the accompanying drawings, which form a part hereof, and which show, by way of illustration, exemplary embodiments of systems and methods implementing the disclosure. The system may, however, be embodied in many different forms and should not be construed as limited to the embodiments set forth herein; rather, these embodiments are provided such that this disclosure will satisfy the statutory requirements and convey the scope of the subject matter to those skilled in the art.

By way of overview, the subject matter disclosed herein may be directed to a proximity-based authentication mechanism for accessing a secure server from a remote location. A computing device performs a pairing operation with the secure server when the computing device is located in a physical proximate vicinity of the secure server. Through this pairing, a secure token is delivered from the secure server to the computing device and stored on the computing device. Once the computing device is so authenticated or paired, the computing device can access the secure server from a remote location using the secure token stored on the computing device. The secure token provides a second level of authentication to the secure server. Alternatively, the secure token may be a seed to generate a one-time password. Once the seed is locally stored on the computing device, the computing device may communicate with the secure server by transmitting a one-time authentication passcode generated from the seed. This proximity-based authentication provides a higher level of security than conventional single factor authentication.

Figure 1:
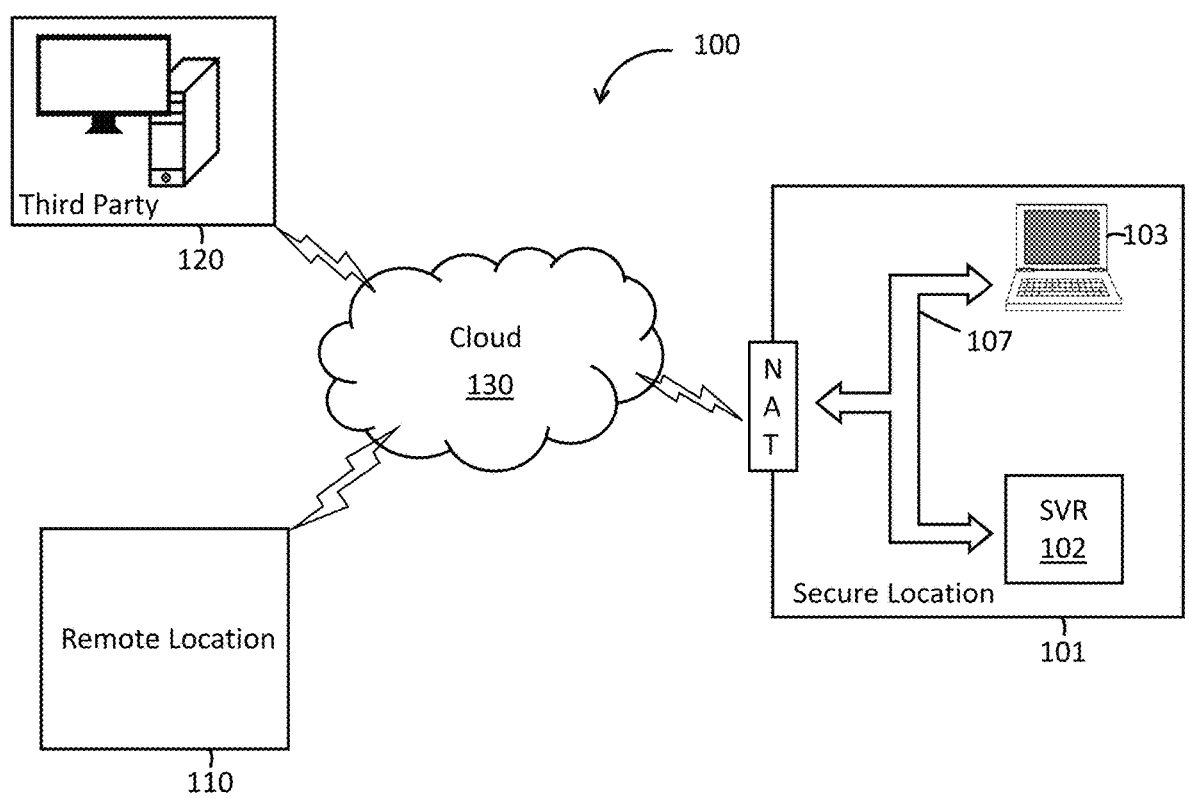
FIG. 1 is a conceptual illustration of a network environment in which embodiments may be implemented.

FIG. 1 is a conceptual illustration of a network environment 100 in which embodiments may be implemented. In this embodiment, the network environment 100 includes a secure location 101, a remote location 110, a third party 120, and a public network (e.g. a "cloud" 130). Each of these components will now be described in detail.

The cloud 130 is a network publicly available and accessible from any computing device via the public network, such as the Internet. The cloud 130 enables disparate computing devices to communicate with each other and exchange information. Many different services, such as websites and email, are made available to remote computing devices through the cloud 130.

The secure location 101 is an environment in which a private network 107 is implemented. A secure server 102 and a computing device 103 are in private communication with each other over that private network 107. In addition, the secure location 101 includes network connectivity to the public network, which enables the secure server 102 and the computing device 103 to communicate with other computing devices via the cloud 130. One specific embodiment of the secure location 101 is illustrated in FIG. 2 and described below.

The remote location 110 is any location outside of the secure location 101 to which a computing device is brought. For example, the remote location 110 could be a coffee shop, an airport, a community center, or any other place at which network connectivity is publicly available. In many embodiments, the remote location 110 is in communication via the cloud 130.

Also illustrated in FIG. 1 is a third party 120, which represents any computing device under control of an individual who is not in a trusted relationship with the secure location 101. In certain instances, the third party 120 may be a malicious individual, such as a hacker, who intends to gain unauthorized access to various internet/online services. The third party 120 is also in communication with other computing devices via the cloud 130.

Figure 2:
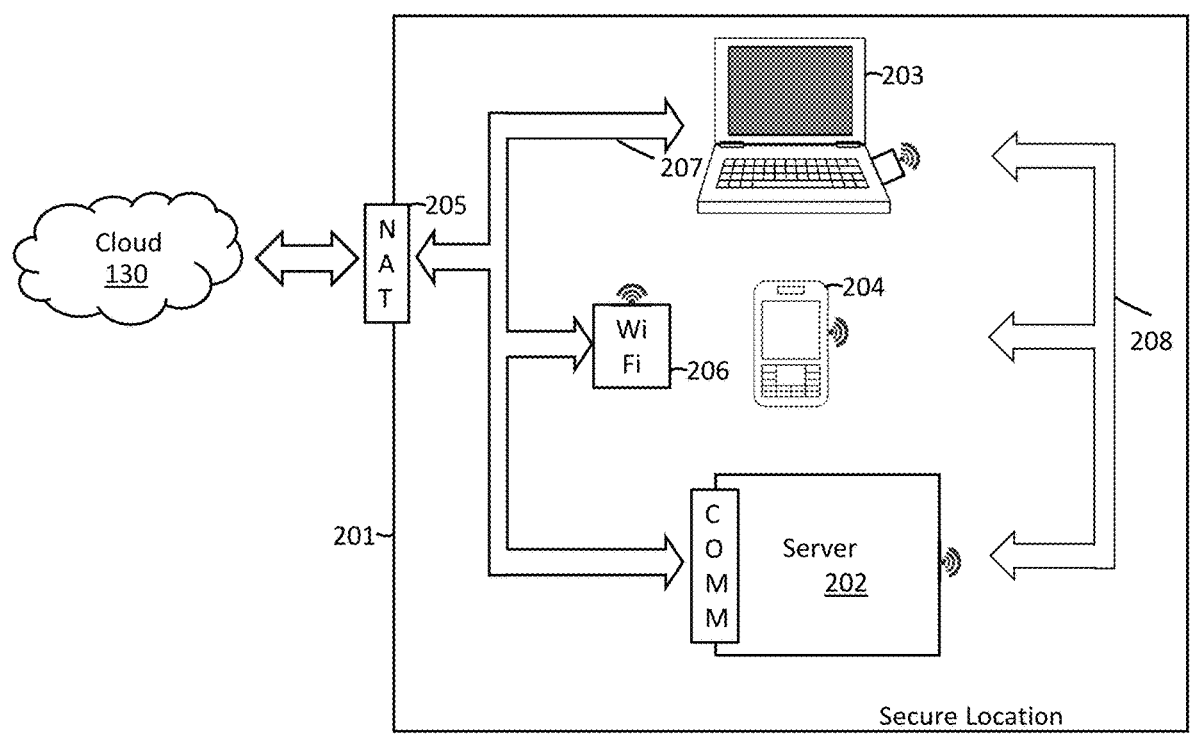
FIG. 2 is a conceptual illustration of a secure location in which embodiments may be implemented.

FIG. 2 is a conceptual illustration of one specific implementation of a secure location 201 in accordance with the disclosure. Implemented within the secure location 201 is a secure private network 207 for computing devices, such as a laptop 203 and a mobile phone 204, and a secure server 202. The computing devices connected to the private network 207 communicate using private IP addresses. However, the secure location 201 also implements network address translation (NAT) 205 to communicate with the public network, such as cloud 130. In this way, computing devices connected to the private network 207 enjoy a degree of security from intrusion by computing devices connected to the public network.

The private network 207 enables network connectivity between computing devices 203, 204 that are connected to the private network. The secure server 202 can be in direct communication with other computing devices 203, 204 through the private network. The secure server 202 may also be in communication with other computing devices 203, 204 within the secure location 201 using a proximity network 208, which may be based on a variety of physical proximity-based connection protocols, including Bluetooth, direct USB connection, Wi-Fi Direct, near field communication (NFC) while the computing devices 203, 204 are in physical proximity to the secure server 202. In the preferred embodiment, the proximity network 208 represents a peer-to-peer communication link between any two devices which are in physical proximity to each other. The close proximity can be established as close as the length of the USB cable or as far as 150-300 feet of Wi-Fi range.

Figure 3:
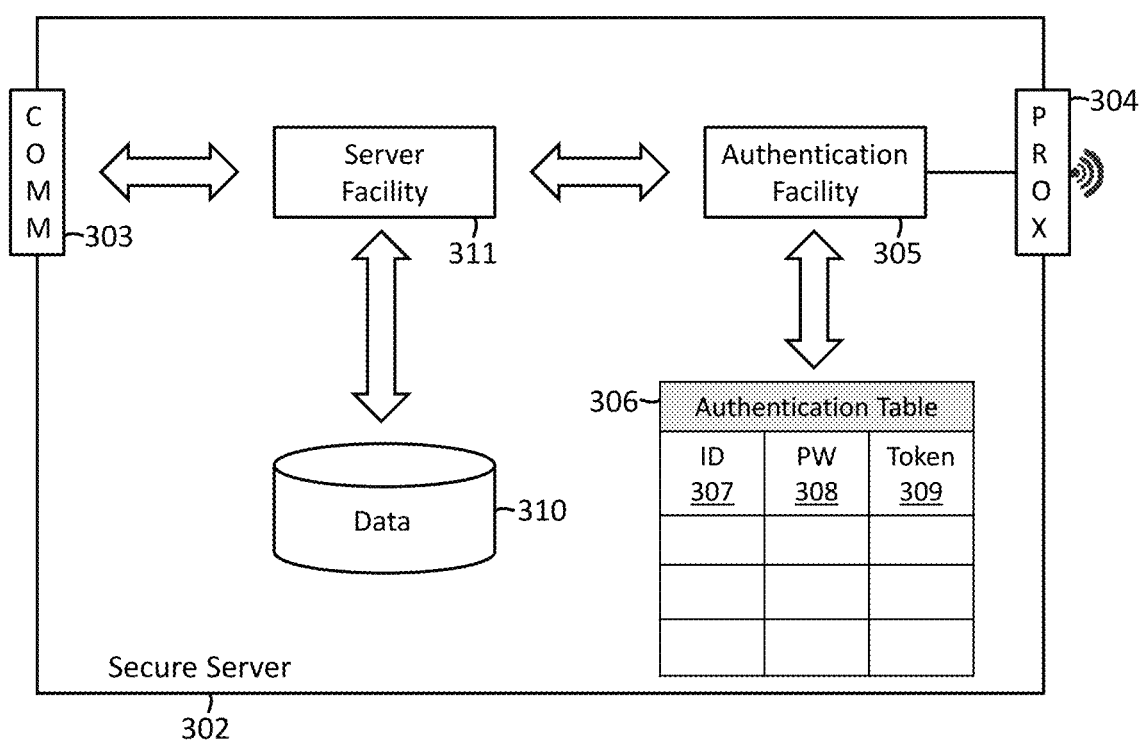
FIG. 3 is a conceptual illustration of a secure server in which embodiments may be implemented.

FIG. 3 is a conceptual illustration of one implementation of a secure server 302 in accordance with embodiments of this disclosure. In this embodiment, the secure server 302 includes a wide area network communication module 303, a proximity communication module 304, an authentication facility 305, an authentication table 306, a data store 310, and server facility 311. Each of these components will be described here.

The communication module 303 is any type of network connectivity component, such as an Ethernet or Wi-Fi connection. The communication module 303 facilitates communication between the secure server 302 and any other computing device over a private or public network.

The proximity communication module 304 is any communication facility that enables peer-to-peer or direct communication with another computing device that is in relatively close physical proximity to the secure server 302. For example, the proximity communication module 304 may take the form of a Bluetooth connection, Wi-Fi connection, Near Field Communication (NFC) connection, USB port, or the like.

The server facility 311 is any component or module which exposes some service to other computing devices over a networking environment, such as the private or public network. There are many examples of such a service, and those examples include email service, file sharing and/or synchronization, database access, or the like. The server facility 311 communicates with other computing devices using the communication module 303.

Data store 310 represents any data that may be used in conjunction with the server facility 311. For instance, if server facility 311 were an email server, data store 310 may be email messages and calendar entries, or the like. Alternatively, if the server facility 311 were a file server or file synchronization service, data store 310 may include documents associated with individual users.

The authentication facility 305 is a module communicating with the proximity communication module 304 and the server facility 311. The authentication facility 305 is configured to perform authentication operations for users of the secure server 302. In one example, the authentication facility 305 communicates over the proximity communication module 304 with other computing devices which are known to be physically proximate to the secure server 302 by virtue of the fact that they are connected using the proximity communication module 304. In such a case, once a user is communicating with the secure server based on the proximity-based communication, the authentication facility 305 may deliver a secure token to the computing device over the proximity communication module 304. The user may, but need not, authenticate with the authentication facility 305, such as by providing an authorized user ID and password pair or biometric information. Once authenticated, the authentication facility may deliver the secure token to the computing device over the proximity communication module 304. In one example, the secure token may take the form of a seed used to generate a one-time authentication password. In such an embodiment, once the seed is locally stored on the computing device, the computing device may communicate with the secure server by transmitting a one-time authentication passcode generated from the seed. In another example, the secure token may take the form of an authenticator key or information (e.g., credentials) as described in the W3C's Web Authentication specification ("WebAuthn") for use in implementations of FIDO authentication systems. In this way, the existence of the secure token/seed on the computing device acts as proof that the computing device was in physical proximity to the secure server 302.

When the computing device is in the physical proximity to the secure server 302, a self-signed certificate may be also transferred to the computing device. The transferred self-signed certificate may allow the computing device to encrypt the communication between the secure server 302 and the computing device via SSL or TLS without using a third party or certificate authority for the communication. The self-signed certificate provides further security for the transfer of the secure token, username and password, seed/secret to generate one-time authentication passcode, and one-time authentication passcode between the secure server 302 and the computing device. Although described as a self-signed certificate, it will be appreciated that a certificate signed by a trusted Certificate Authority may also be used.

The authentication table 306 maintains authentication information about users (or devices) who (or that) are authorized to access the secure server 302. In one embodiment, a user ID 307 and password 308 are stored for each authorized user. Alternatively, in instances where authentication is not required, the authentication table 306 may be omitted or altered to eliminate dependence on user IDs or passwords.

For any authorized users who have also gone through the proximity pairing process, the authentication table 306 may also include a copy of the security token/seed that was created during that proximity pairing process. In other words, when the authentication facility 305 performs a proximity-based authentication (e.g., the proximity pairing process), the authentication table 306 is accessed to compare if the user ID and password received from the computing device match the user ID 307 and password 308 in the authentication table 306. Those skilled in the art will appreciate that information stored in the authentication table 306 may be a representation of the data rather than the actual data itself. For instance, the password 308 and the token 309 maintained in the authentication table may be hash values rather than the actual password or the actual token. The secure token 309 may be a digital certificate, WebAuthn authentication key, or any other similar types of identifiers. Further, the proximity token/seed may not be associated with each user, so that the authentication table 306 may store a token and the corresponding password, or a seed and the corresponding one-time authentication passcode.

Figure 4:
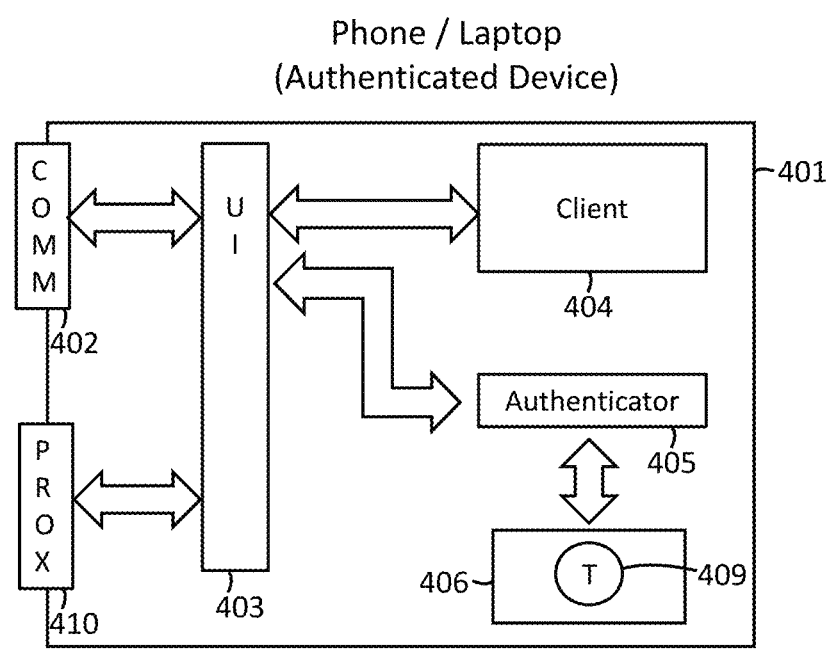
FIG. 4 is a conceptual illustration of an authenticated device in which embodiments may be implemented.

FIG. 4 is a conceptual illustration of one embodiment of an authenticated device 401 in accordance with this disclosure. The authenticated device 401 may be any manner of computing device intended to connect to another computing device, such as secure server 302, over a network. In the preferred embodiment, the authenticated device 401 typically includes a communication module 402, a proximity communication module 410, a user interface 403, a service client 404, an authenticator 405, and some form of storage 406.

The communication module 402 enables the authenticated computing device 401 to communicate with other computing devices in a networking environment. In one example, the communication module 402 may be an Ethernet port, a Wi-Fi connection, or the like.

The proximity communication module 410 enables the authenticated computing device 401 to communicate with a computing device which is in physical proximity to the authenticated device 401. In other words, the proximity communication module 410 supports short range communication only, and may only be used by other computing devices that are physically proximate to the authenticated computing device 401. Examples of such a module include a Bluetooth connection, NFC connection, USB or similar wired port, or the like. Other examples will become apparent to those skilled in the art.

The user interface 403 is a mechanism for a user to manipulate the operating system of the authenticated computing device 401. The user interface 403 may include a display, keyboard, or other part of the authenticated computing device 401 to enable the user interaction with the authenticated computing device 401.

The service client 404 is a module that enables interaction with some service over the communication module 402. For example, service client 404 may interact with the server facility 311 (FIG. 3) to implement an email function. Alternatively, service client 404 may interact with the server facility 311 to manage or administer documents or other files.

The storage 406 is any persistent data storage facility, such as an SSD drive or flash memory, hard disk drive, or the like. In this particular embodiment, a secure token/seed 409 is stored in the storage 406. The secure token 409 may be any data that is difficult to reproduce without having the actual secure token 409. In one example, the secure token 409 may be a digital certificate, other lengthy hexadecimal code, or the like.

The authenticator 405 is a component that performs authentication services for the authenticated device 401. When the client 404 attempts to connect to a remote service (e.g., server facility 311), the authenticator 405 performs the authentication of the authenticated computing device 401 to the remote service. In some embodiments, the authenticator 405 may implement functions and application programming interfaces (APIs) in accordance with the WebAuthn specification and FIDO project. In accordance with this embodiment, the authenticator provides a copy of the secure token/ one-time authentication passcode generated from the seed 409 to the remote service during the authentication process to confirm that the authenticated device has, in fact, been in physical proximity to the remote service.

In addition, the authenticator 405 may establish a trust relationship (e.g., a pairing process) with the remote service when the authenticated device 401 is in proximity to a physical component of the remote service (e.g., secure server 302). In such a pairing process, the authenticator 405 may further prompt a user for an ID and password to input to the secure server.

To repeat, the authenticator 405 retrieves a secure token/ one-time authentication passcode generated from the seed 409 from the storage 406 and transmits a user ID, password, and the secure token/one-time authentication passcode generated from the seed 409 to a secure server. The authenticator 405 receives notification of authentication or non-authentication from the secure server. If the remote authentication is performed successfully, the authenticated computing device 401 is allowed to access, such as by client 404, to the secure server more securely than ordinary ID/password authentication.

Figure 5:
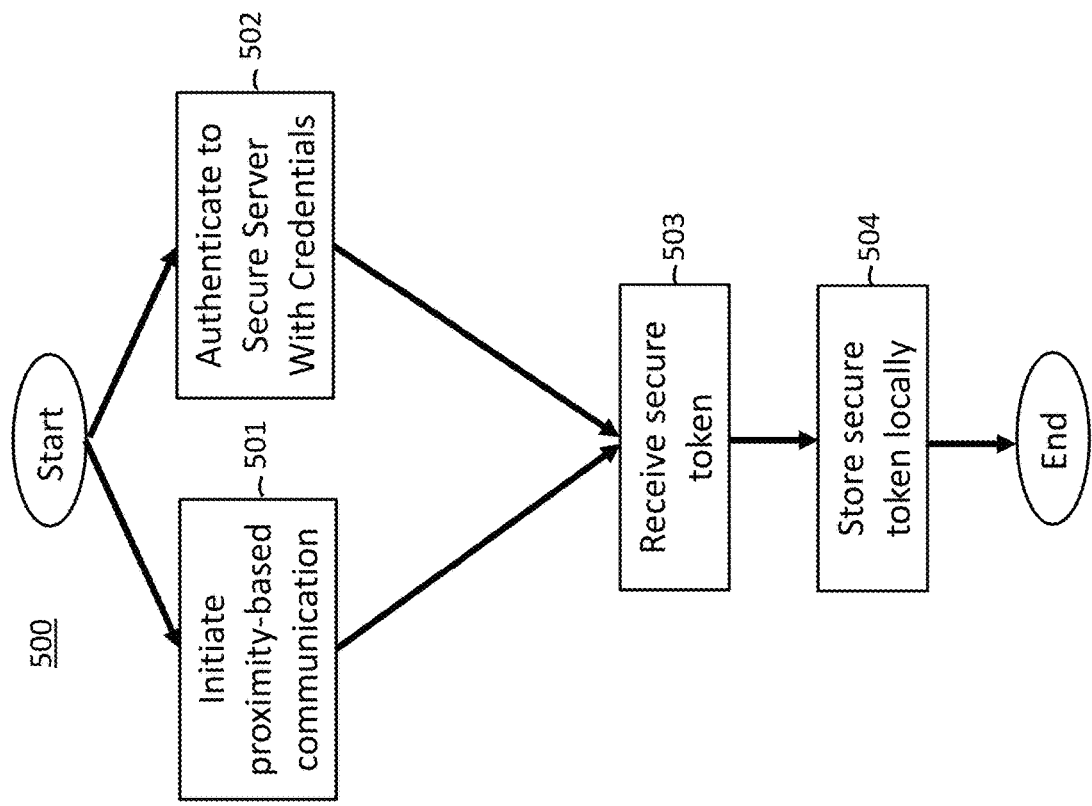
FIG. 5 is a flow chart illustrating a method of enabling proximity-based authentication in a secure location.

FIG. 5 is a flow chart illustrating a method 500 of enabling proximity-based authentication in a secure location. To access a secure server from a computing device, the computing device is required to be authenticated by the secure server. To begin, the computing device initiates a proximity-based communication (i.e., a pairing process) with the secure server (step 501). The proximity-based communication may be established through any of a variety of proximity-based connection mechanisms, such as Bluetooth, direct USB connection, Wi-Fi Direct, near field communication (NFC), or the like. The proximity-based communication is only possible while the computing device is in physical proximity to the secure server. Once the proximity-based communication is established between the computing device and secure server, the computing device may automatically receive a secure token/seed.

Alternatively, the computing device may perform initial authentication to the secure server (step 502) with user credentials. Such an initial authentication is typically performed by providing a user ID and password from the computing device to the secure server. This initial authentication may be performed when the computing device communicates with the secure server for the first time and while the computing device is in physical proximity to the secure server. If the user ID and password are matched, the computing device is authenticated to the secure server. In embodiments that do not require a user ID and password, the physical proximity may be sufficient to satisfy the trust relationship.

If the authentication is successful, based either on proximity of the user device alone (step 501) or authentication of the user while the computing device is in physical proximity (step 502), the authenticated computing device receives a secure token/seed from the secure server (step 503). In some embodiments, the secure token/seed may be implemented as WebAuthn authentication information or keys.

The authenticated computing device stores (step 504) the secure token/seed for later use during subsequent authentication operations. The secure token/seed may also be maintained at the secure server in association with the authorized user ID and password, if used.

Figure 6:
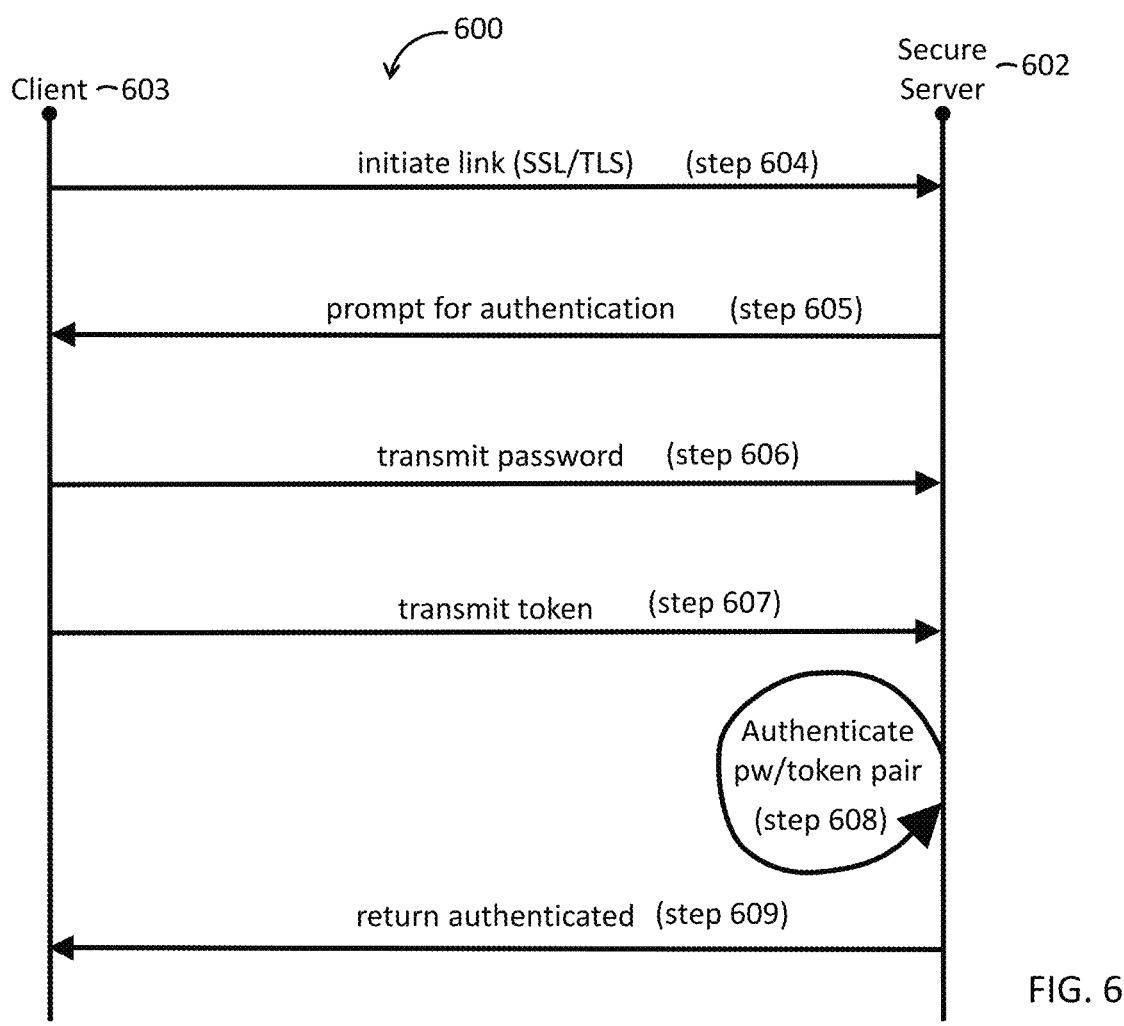
FIG. 6 is a diagram illustrating a security network formed between a computing device (e.g. client) and secure server for establishing proximity-based communication.

FIG. 6 is a diagram illustrating a process performed between a computing device (e.g. client) 603 and a secure server 602 to authenticate the computing device 603 to the secure server 602. The secure server 602 may be located within a secure location, and the client 603 may be remotely located outside of the secure location.

As part of the authentication process 600, the client 603 imitates a secure link to the secure server 602, such as a Transport Layer Security (TLS) or Secure Sockets Layer (SSL) session (step 604).

Once the secure link is established, the secure server 602 prompts the client 603 for authentication. The secure server 602 may do so in many ways, such as by prompting for a user ID and password, or the like. Alternatively, the secure server 602 may implement WebAuthn protocols and APIs to accomplish authentication. In such an embodiment, the secure server 602 may act as a Relying Party as described in the WebAuthn specification.

In response, the client 603 transmits a user ID/password to the secure server 602 (step 606), and may also transmit a secure token/one-time authentication passcode generated from the seed from the client 603 to the secure server 602. Alternatively, the client 603 may implement an attestation function in accordance with the WebAuthn specification. In accordance with this disclosure, the presence of the secure token/seed at the client 603 demonstrates that the client was at one time in physical proximity to the secure server 602 and performed an initial pairing process. In one alternative embodiment, the user ID/password pair may not be necessary once the client 603 receives a secure token/seed through an initial authentication pairing. As noted, the secure token/seed may also be implemented as WebAuthn authentication information or keys.

The secure server 602 compares the user ID/password combination and the secure token/one-time authentication passcode generated from the seed received from the client 603 to determine if the client 603 is authorized to access the secure server 602 (step 608). Such a determination may, in some implementations, be in conformance with the procedures and technologies described in the WebAuthn specification for authenticating users.

If the user ID/password combination (if used) and the secure token/one-time authentication passcode generated from the seed are confirmed, the secure server 602 may notify the client 603 that the client is authenticated (step 609). In this way, the client 603 may interact with some service being served by the secure server with a higher level of trust than simply using a user ID/password pair.

Figure 7:
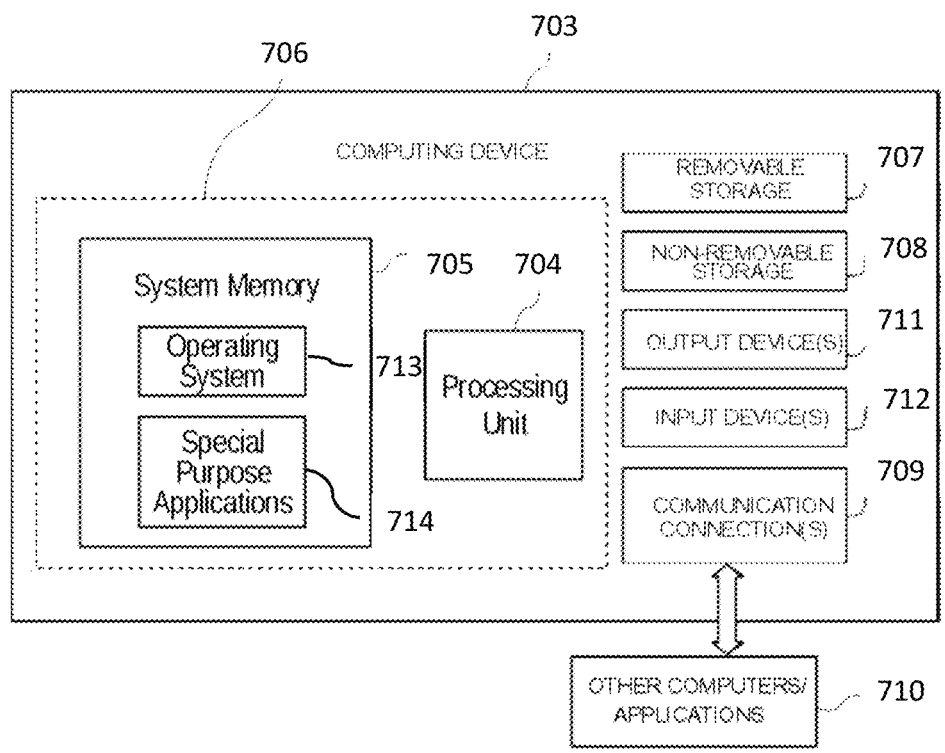
FIG. 7 is a functional block diagram generally illustrating a computing device in which embodiments of the disclosure may be implemented.

FIG. 7 is a functional block diagram of an exemplary special-purpose computing device 703 that may be used to implement one or more embodiments. The computing device 703, in one basic configuration, includes at least a processor 704 and a memory 705. Depending on the exact configuration and type of computing device, memory 705 may be volatile (such as RAM), non-volatile (such as ROM, flash memory, etc.), or some combination of the two. This basic configuration is illustrated in FIG. 7 by dashed line.

Memory 705 includes at least an operating system 713 and may additionally include other special purpose components 714. The operating system 713 includes components and functions to enable the computing device 703 to function at a basic level. Examples of the operating system components may include a file system and graphical user environment. The operating system 713 may also include components for communicating over a local or wide area network, such as an Internet browser. Special purpose components 714 may include other components to enable the computing device 705 to perform specific tasks. For instance, the special purpose components 714 may include an authentication facility, an authenticator, or the like. In addition, like the operating system 713, the special purpose components 714 may also include components for communicating over a local or wide area network, such as an Internet browser, or the like.

Computing device 703 may have other features and functionality also. For example, device 703 may also include additional storage (removable and/or non-removable) including, but not limited to, magnetic or optical disks or tape. Such additional storage is illustrated in FIG. 7 by removable storage 707 and non-removable storage 708. Computer storage media includes volatile and nonvolatile, removable and non-removable media implemented in any method or technology for storage of information such as computer readable instructions, data structures, program modules or other data. Memory 705, removable storage 707 and non-removable storage 708 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 705. Any such computer storage media may be part of device 705.

Computing device 705 includes one or more communication connections 709 that allow computing device 705 to communicate with one or more computers and/or applications 710. Device 703 may also have input device(s) 712 such as a keyboard, mouse, digitizer or other touch-input device, voice input device, etc. Output device(s) 711 such as a monitor, speakers, printer, PDA, mobile phone, and other types of digital display devices may also be included. These devices are well known in the art and need not be discussed at length here.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar references in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely intended to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described, are possible. Similarly, some features and sub-combinations are useful and may be employed without reference to other features and sub-combinations. Embodiments have been described for illustrative and non-restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

What is claimed is:

1. A non-transitory computer-readable medium containing program instructions for remotely enabling proximity-based authentication, wherein execution of the program instructions by one or more processors of a computer system causes the one or more processors to carry out the steps of:

initiating proximity-based communication between a computing device and a secure server within a secure location;

prompting for local authentication of the computing device to the secure server based on proximity-based authentication;

delivering a secure token to the authenticated computing device and storing the secure token on the computing device;

prompting for remote authentication of the authenticated computing device to the secure server when the authenticated computing device is located outside of the secure location; and securely connecting the authenticated computing device to the secure server in response to the secure token.

2. The non-transitory computer-readable medium of claim 1, further comprising:

maintaining an authentication table including a plurality of passwords and secure tokens, each of which corresponds to each password for the computing device; and matching a pair of a password and the secure token received from the computing device to the authentication table for the remote authentication.

3. The non-transitory computer-readable medium of claim 1, further comprising matching a password received from the computing device for the local authentication.

4. The non-transitory computer-readable medium of claim 1, further comprising initiating a link between the authenticated computing device and the secure server when the authenticated computing device is located outside of the secure location.

5. The non-transitory computer-readable medium of claim 1, wherein the proximity-based communication further comprises at least wired or wireless communication.

6. The non-transitory computer-readable medium of claim 1, wherein the secure token is a form of one-time authentication passcode seed.

* * * * *